United States Patent [19]

Kobayashi et al.

[11] 3,911,396

[45] Oct. 7, 1975

[54] DATA TRANSMISSION SYSTEM

[75] Inventors: Shinzo Kobayashi; Takahisa Ohta, both of Amagasaki, Japan

[73] Assignee: Mitsubishi Denki Kabushiki Kaisha, Japan

[22] Filed: Dec. 18, 1973

[21] Appl. No.: 425,818

[30] Foreign Application Priority Data

Dec. 26, 1972 Japan .................................. 48-162

[52] U.S. Cl................. 340/147 SC; 325/41; 178/50

[51] Int. Cl.$^{2}$.... H04B 7/00; H04Q 9/00; H04L 5/00

[58] Field of Search............... 340/147 SC, 147 R, 146.1 BE, 340/146.1 BA, 147 LP, 163; 325/41; 178/3, 50

[56] References Cited

UNITED STATES PATENTS

| | | | |
|---|---|---|---|
| 3,273,063 | 9/1966 | Da Silva et al. | 325/41 |
| 3,394,349 | 7/1968 | Day | 340/163 |
| 3,493,678 | 2/1970 | Da Silva | 340/146.1 BE |

*Primary Examiner*—Donald L. Yusko
*Attorney, Agent, or Firm*—Robert E. Burns; Emmanuel J. Lobato; Bruce L. Adams

[57] ABSTRACT

In systems for transmitting data between a plurality of terminal stations and a central station through a plurality of channels assigned in common to the terminal stations, the control circuit for the transmission/reception for each of the terminal stations includes channel switching means and time delay means. When one of the terminal stations receives no confirmation signal from the central station indicating the reception of the data from that station, the latter effects the retransmission by using a channel and a time delay as determined by the channel switching and time delay means determine either in accordance with its address or at random by utilizing a PN sequence generator or a random code generator. The above process is repeated until the confirmation signal received.

5 Claims, 7 Drawing Figures

DATA TRANSMISSION SYSTEM

BACKGROUND OF THE INVENTION

This invention relates to a data transmission system for transmitting data between a central station and a multiplicity of terminal stations.

In data handling systems comprising a central station including, for example, a data transmission device a signalling control device, a central processing apparatus etc., and a multiplicity of terminal stations each including, for example, a data transmission device and terminal equipment for calling the central station to transmit data thereto at random, the assigment of exclusive channels to the terminal stations leads to an undesirably low efficiency of utilization of the channels and particularly in the case when the number of the terminal stations is very large but each of the stations has a small calling amount defined by a calling frequency multiplied by a mean reservation time. Under these circumstances, it is desirable to assign a single channel or a plurality of channels to either the whole of the terminal stations or each of groups into which the terminal stations are grouped to permit the terminal stations to utilize either the single channel or the plurality of channels in common for the purpose of increasing the efficiency of utilization of the channels.

SUMMARY OF THE INVENTION

Accordingly it is an object of the present invention to provide a new and improved data transmission system making it possible to utilize transmission channels in common by a plurality of terminal stations while at least two of the terminal stations are prevented from continuously effecting the simultaneous transmission through a common channel.

The present invention accomplishes this object by the provision of a data transmission system for transmitting data between a central station and a plurality of terminal means, comprising a central station, a plurality of terminal stations, a plurality of channels assigned in common to the plurality of terminal stations for data transmission, control means for controlling the transmission from and the reception by each of the terminal stations, time delay means and channel switching means included within the control means, each of the terminal stations being operative to transmit data to said central station through a predetermine one of the channels, and the central station being operative to receive the data from each of the terminal station and to deliver a confirmation signal to the each terminal station following the reception of the data. Each of the terminal station transmit the data to the central station upon the reception of the confirmation signal, and means responsive to the absence of a confirmation signal from the central station in each of the terminal station due to the data being not received by the central station operate both the time delay means and the channel switching means so that the data is transmitted to the central station with a time delay as determined by the time delay means and through another predetermined channel switched from said predetermined channel by the channel switching means.

BRIEF DESCRIPTION OF THE DRAWINGS

The present invention will become more apparent from the following detailed description taken in conjunction with the accompanying drawings.

DESCRIPTION OF THE PREFERRED EMBODIMENTS

Figure 1:
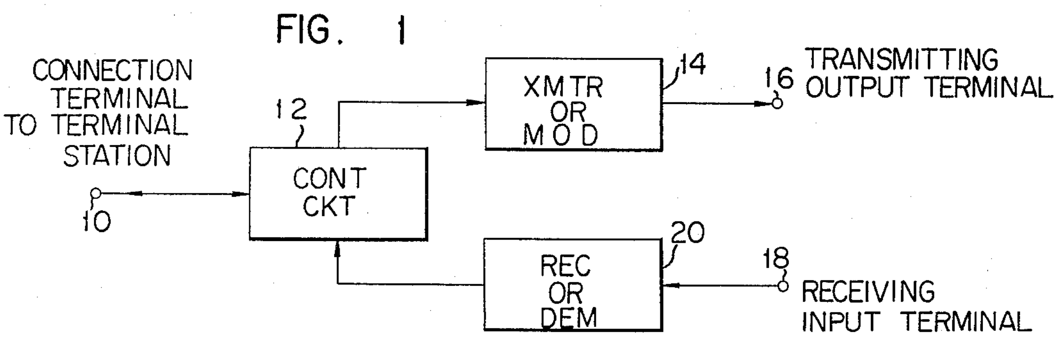
FIG. 1 is a block diagram of data transmission equipment for a terminal station constructed in accordance with the principles of the present invention.

Referring now to the drawings and FIG. 1 in particular, there is illustrated a data transmission system provided on a terminal station in accordance with the principles of the present invention. The arrangement illustrated comprises a connection terminal 10 leading to a terminal station (not shown), a control circuit 12 connected to the connection terminal 10, a transmitter or a modulator 14 connected to the control circuit 12 and an output terminal 16 for transmission connected to the transmitter or modulator 14. The arrangement further comprises an input terminal 18 for reception and a receiver or a demodulator 20 which is, in turn, connected to the control circuit 12.

While the single connection terminal 10 is illustrated in FIG. 1, a plurality of such terminals may be actually used. Also, if desired, a single terminal may be used in place of the output and input terminals 16 and 18 respectively.

When the terminal station (not shown) applies a signal for requesting a call to the control circuit 12 through the connection terminal 10, the control circuit 12 starts the transmitter 14. Thereafter the control circuit 12 delivers a "transmission permissible" signal back to the terminal station through the connection terminal 10. The term "call" or "calling" used herein means the delivery or transmission of data. The terminal station responds to the "transmission permissible" signal to transmit data through the connection terminal 10, the control circuit 12 to the transmitter 14 and thence through the transmitting output terminal 16 to the associated central station (not shown). The data includes an address for the terminal station, and may additionally include an error detection bit and an error correction bit etc.

After having correctly received the data from the terminal station, the central station delivers a confirmation signal to the receiver 20 through the receiving input terminal 18. Then the control circuit 12 is operated to determine if that confirmation signal is sent to the associated terminal station. When the conformation signal has been sent to the associated terminal station as determined by the control circuit 12, the latter applies a "completion-of-call" signal through the connection terminal 10 to the terminal station resulting in the completion of the particular call or the data transmission.

Actually, a relatively small number of channels through which data are transmitted to the central station is common to a multiplicity of terminal stations while the individual terminal stations can request calls at random. Therefore data from at least two terminal stations may be simultaneously transmitted through the same channel to the central station where the data may be incorrectly received.

There have been previously proposed various attempts to decrease a probability of simultaneously transmitting data from at least two terminal stations to a central station. These attempts have been unsatisfactory and it has been impossible to completely prevent at least two terminal stations from simultaneously transmitting data to the central station. Some of the attempts will now be briefly described.

(1) Data from each of the terminal stations has a format including its address on a first portion thereof or immediately after a synchronizing signal involved while the central station is operative to receive and respond to an address in data from one terminal station. Immediately after the reception of the address, the central station delivers the received and respond address back to the one terminal station while inhibiting calls from terminal stations other than that terminal station having the address received by the central station. This measure does not inhibit terminal stations other than one calling station from calling the central station prior to the central station receiving the address of the one calling station.

(2) Immediately after having sensed a signal from one terminal station, the central station delivers a busy signal to inhibit calls from terminal stations other than the terminal station which has already initiated the transmission. This measure requires the lapse of some time interval until the central station senses a signal from one terminal station and also until the terminal stations sense the busy signal from the central station. Thus it is impossible to prevent the other terminal stations from calling during such a time interval.

(3) Each terminal station is provided with a receiver for monitering the associated transmission channels, in addition to a receiver for receiving signals from the central station whereby the terminal station, is prevented from calling when the monitering receiver continues to sense the transmission from any other terminal station to the central station. This measure also requires the lapse of some time interval until the monitering receiver senses a signal transmitted from any other terminal station. This does not prevent other terminal stations from calling during this time interval.

(4) Before data transmission, any terminal station or stations is or are arranged first to send a call initiation signal or signals to the central station to ask for the data transmission. Then only that terminal station having a response signal from the central station to be permitted to call transmits data to the central station while the central station sends a busy signal to inhibit calling from these terminal stations not permitted to call. This measure ensures that two or more of the terminal stations are prevented from simultaneously transmitting data to the central station. However, it is impossible to prevent at least two terminal stations from simultaneously delivering the call initiation signals.

If the simultaneous transmission from at least two terminal stations has occurred in a common channel to prevent the central station from correctly receiving any of the signals transmitted from the terminal stations, then the central station can not send a confirmation signal back to those terminal stations from which the signals have been transmitted. In this event, the central station sends no signal back to any of the calling stations. Alternatively, the central station may send a "request of re-transmission" signal back to the calling terminal stations. Under these circumstances, a call from the particular terminal station is not completed through the single transmission so that the transmission is required to be repeated until the call is completed. If this repetition of transmissions is not proper then two or more of the terminal stations which have initially and simultaneously called the central station, and may again effect the simultaneous transmission through the same channel. This results in a highly objectionable condition since the call is not completed for any length of time.

Accordingly it is an object of the present invention to eliminate the objection as above described by the provision of means ensuring that a call from any of the terminal stations is completed within several repeated transmissions so as not to temporarily superimpose the call on a call from any of the other terminal stations.

The principles of the present invention will now be described with reference to FIG. 2. It is assumed that the central station transmits synchronizing signals in the form of specific bits in a specific pattern at predetermined constant time intervals of To in the absence of a call from any of terminal stations as shown in FIG. 2A. Each of terminal stations is responsive to each of the synchronizing signals received to thereby deliver data preliminarily inputted thereto and stored for example in a buffer memory. It is also assumed that the central station does not deliver the next succeeding synchronizing signal during the reception of data or any other input signal from any of the terminal stations. Data from any of the terminal stations include a synchronizing signal S', an address of that terminal station, an intelligence or information signal D and an end signal F such as shown in FIGS. 2B or 2C. If a down circuit extending from the central station to one of the terminal stations is different from an up channel extending from the one terminal station to the central station then the synchronizing signals S and S' can be equal in both the duration of the bit and the pattern to each other. On the other hand, if the down channel is the same as the up channel then both synchronizing signals S and S' may be different in the pattern and/or the duration of the bit from each other.

When the central station receives correct data from one of the terminal stations, the same sends a confirmation signal R (see FIG. 2A) back to the one terminal station. The central station is conventionally provided with means for detecting an error that may be present in the received data through the utilization of an error detection bit contained in the data. By correctly receiving the confirmation signal, the one terminal station is advised that the data transmitted therefrom has been correctly received by the central station.

Under these circumstances, there is a probability of simultaneously transmitting individual data from a plurality of terminal stations wherein their own data have been preliminarily and simultaneously inputted to their input devices, for example their key boards, after the terminal stations have received and sensed a synchronizing signal from the central station.

If the plurality of terminal stations have different transmission channels leading to the central station, there is no problem because the terminal stations can correctly transmit their own data to the central station without any interference with one another. However, if a multiplicity of terminal stations utilize a relatively small number of up circuits in common to one another, then it occurs with a certain probability that a plurality of terminal stations simultaneously deliver their data to the central station through a common channel or channels.

The principles of the present invention are to prevent a plurality of terminal stations from continuing to effect the simultaneous transmission of their data through a common channel or channels by causing a first and a second terminal station to perform the operations of "differently jumping channel", and effect the second transmission of the data with different time delays in a permissible number of attempts.

There are considered various processes of "differently jumping the channels" and "providing different time delays."Some of these processes will now be described.

a. Different channels and different time delays are imparted to different terminal stations dependent upon the addresses thereof;

b. The random jump of channels and a random time delay is imparted to each of terminal stations as by using a random pseudo-sequence generator (which may be called thereinafter a "PN generator" for generating this random jump of channels and random time delay. The generator has its initial state set in accordance with the address number of the associated terminal station;

c. Each of the terminal stations is subject to both a completely random jump of channels and a completely random time delay;

d. The processes (a), (b) and (c) are mixed with one another. For example, each of terminal stations may be given a channel dependent upon its address and a completely random time delay.

As an example, the process (a) will now be described with reference to FIG. 2. FIG. 2A shows data transmitted by the central station, while FIGS. 2B and FIG. 2C illustrate data transmitted by a first and a second terminal station having address Nos. 1134 and 1057 respectively. It is assumed that in each of the terminal stations a channel through which its data is first transmitted to the central station is selected in accordance with a digit in a first digit position of its address number or the most significant digit thereof. For example, the channels are numbered $f_1, f_2 \ldots f_{10}$ and digits 0, 1 . . . , K . . . 9 at the most significant digit position correspond to the channels $f_1, f_2 \ldots f_{K+1} \ldots f_{10}$ respectively. Under the assumed condition, both terminal stations has a digit 1 in the first digit position of their addresses so that the terminal stations first call the central station by using the circuit $f_2$ (see FIGS. 2B and 2C) resulting in the simultaneous call. In that event, the terminal stations can not receive a confirmation signal from the central station. Alternatively the central station may transmit a signal, for requesting re-transmission, to the terminal stations.

Then both terminal stations will again call the central station. In this second call, it is assumed that the transmission is effected with a time delay dependent upon a digit in a second digit position of the address number or a digit following the most significant digit thereof. More specifically, that terminal station having a digit of "0" in the second position of the address is arranged to effect the re-transmission after it has received the next immediate synchronizing signal. For the second digit having a value of 1, the associated terminal station is arranged to effect the re-transmission after a second synchronizing signal has been received. Generally, with the second digit position of the address number having a digit of K, the re-transmission is effected after the reception of a (K + 1) th synchronizing signal. Then a channel used for re-transmission is determined by a digit in a third digit position of the address number in the same manner as above described in conjunction with the most significant digit thereof.

The process as above described is repeated until a confirmation signal from the central station is received. Upon receiving the confirmation signal, the terminal station terminates its transmission.

Figures 2A, 2B, 2C:
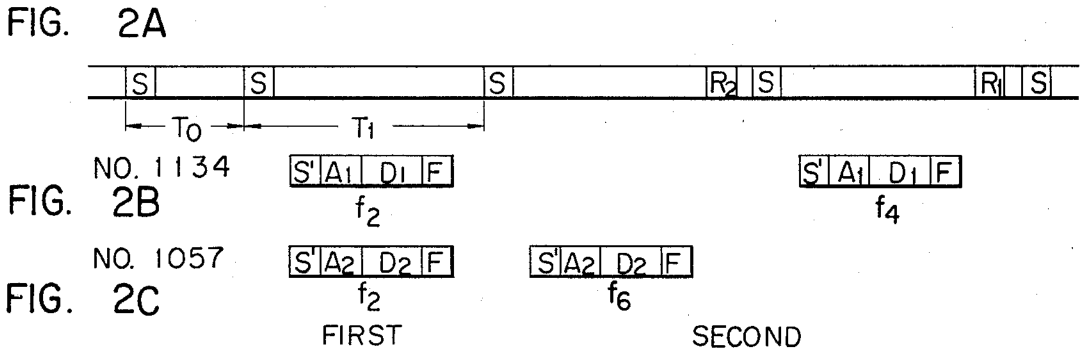
FIGS. 2A, B; C are diagrams illustrating one form of the temporal relationship held during data transmission and reception effected between a terminal station utilizing the data transmission equipment shown in FIG. 1 and a central station.

In the example illustrated in FIG. 2, the first and second terminal stations simultaneously effect the first transmission through a common channel numbered $f_2$ because their addresses have the most significant digit of 1. This results in the reception of no confirmation signal. Then the second terminal station No. 1057 effects the second transmission through a channel $f_6$ upon the reception of the next immediate synchronizing signal because the address number has digits of 0 and 5 in the second and third digit positions thereof respectively. On the other hand, the first terminal No. 1134 effects the second transmission through a channel $f_4$ upon the reception of a second synchornizing signal because the second and third digit positions of the address has digits of 1 and 3 respectively. In this way, the simultaneous re-transmission through the same channel has been avoided. The central station delivers confirmation signals $R_2$ and $R_1$ to the second and first terminal stations respectively as shown in FIG. 2A. A numeral suffixed to the "R" identifies the terminal station. For example, "$R_1$" designates a confirmation signal delivered to the first terminal station. Then the terminal stations Nos. 1134 and 1057 confirm that their data have been received by the central station whereupon the re-call terminates.

If the second call does not lead to the reception of the confirmation signal, the re-calling is effected by utilizing time delays dependent upon a digit in the fourth digit position of the address numbers and a channel as determined by the most significant digit thereof.

From the foregoing it will be appreciated that in the case of terminal stations having four digit address numbers, the simultaneous call using the same circuit can be eliminated with at most three calls. This is because the terminal stations have different address numbers.

The process utilizing digits per se in respective digit positions of the address number of terminal stations has been described. Such a process, however, should include ten common channels because each digit position of the address number has any one of digits 0, 1 . . . , 9. Further, if the normal time interval $T_o$ (see FIG. 2A) between the synchronizing signals or a time slot $T_1$ (see FIG. 2A) corresponding to a length of data transmitted by the particular terminal station is long then the time delay is fairly long. The time delay may have the longest time interval of from 9$T_o$ to 9$T_1$. This leads to the disadvantage that a fairly long time elapses until a call is completed.

If it is desired to decrease the number of the channels or the time delay, then a digit K in each of the digit positions of the address number can be transformed to a number K' equivalent thereto the numeral K' having a modulo $n$ that is any suitable integer equal to or less than nine. That is, the relationship $0 \leq K' < n$ *holds. Then a channel number* ($fK' + 1$) and/or a time delay of from $K'T_0$ to $K'T_1$ are or is imparted to one terminal station depending upon the K'. This measure permits the number of the channels to decrease to $n$ while the longest time delay decreases to a value of from $(n-1)t_0$ to $(n-1)T_1$. However, it is disadvantageous in that some of the terminal stations, although different in address number, may select the same channel number or an identical time delay.

The time intervals at which the central station delivers the synchronizing signals S can be equal to either a predetermined fixed time interval $T_0$ in the absence of a call from any terminal station or a time interval suited to a length of data involved as in the example described above. Alternatively, the central station may regularly deliver the synchronizing signals at appropriate time intervals T longer than a maximum length of data. In the latter case, a great change in the length of data decreases the efficiency of utilization of channels.

Where some of the terminal stations call the central station at will resulting in the presence of simultaneously calling stations without the central station delivering the synchronizing signals, the process as above described may be utilized to produce time delays to prevent the simultaneous call. In that event, the temporal overlap of data from at least two terminal stations may lead to the simultaneous call. This measure is disadvantageous in that a probability of the simultaneous call increases particularly for data longer in duration.

According to the principles of the present invention, the control circuit 12 as shown in FIG. 1 has disposed therein a circuit for controlling a transmission channel and a time delay in order to perform the process (a) as above described.

Figure 3:
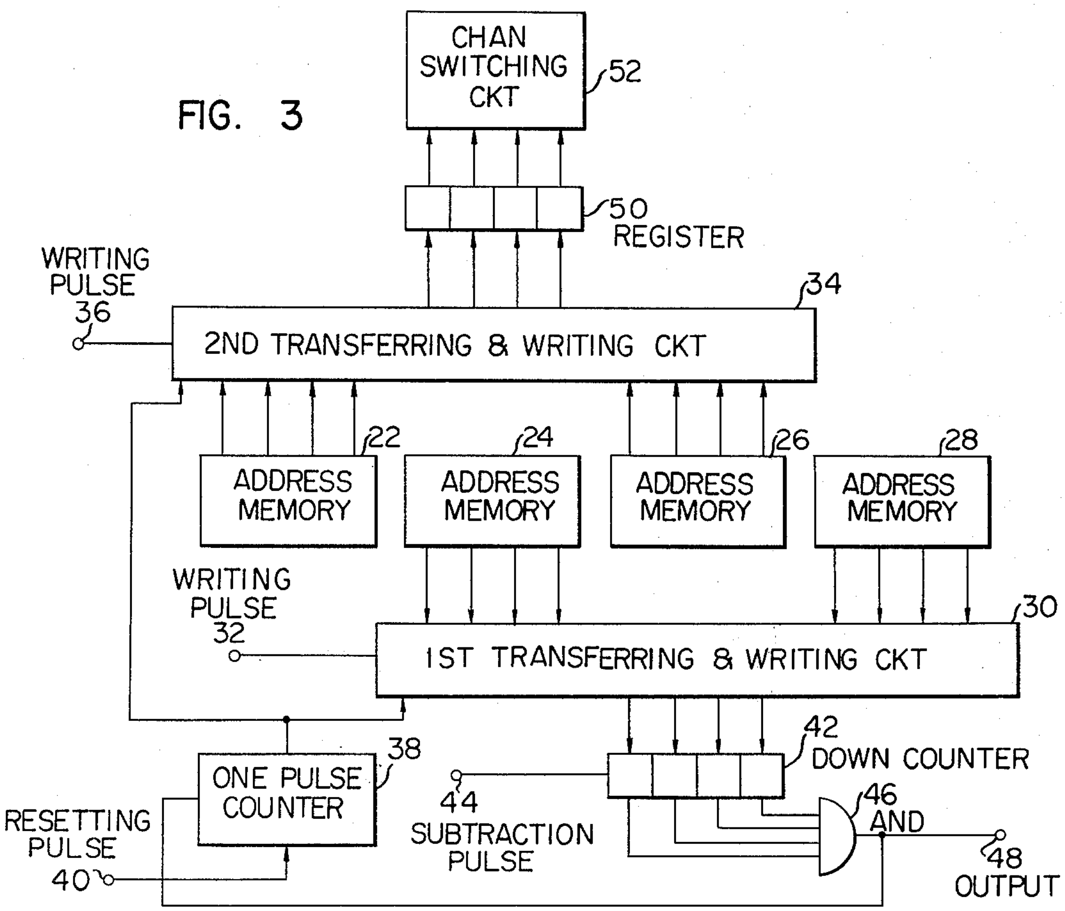
FIG. 3 is a block diagram of a circuit for controlling a transmission channel and a time delay for data transmission in accordance with the principles of the present invention.

Referring now to FIG. 3, there is illustrated an embodiment of the present invention. The arrangement illustrated comprises a plurality, in this case, four, of address memories 22, 24, 26 and 28. Assuming that an address of each of the terminal stations is in the form of a four digit decimal number such as "*abcd*", the memory 22 has stored therein a digit "*a*" in a first digit position or the most significant digit of the address, and the memory 24 has stored therein a digit *b* in a second digit position thereof. Similarly the memories 26 and 28 have stored therein a digit *c* in a third digit position and a digit *d* in a fourth digit position or the least significant digit of the address respectively. Also assuming that the decimal number for the address is represented by the binary coded decimal notation, each of the memories includes four output conductors one for each bit.

As shown in FIG. 3, the memory 24 for the digit *b* and the memory 28 for the digit *d* are connected by the four conductors to a first transferring and writing circuit 30 including a first writing terminal 32 while the memory 22 for the digit *a* and the memory 26 for the digit *c* are connected by the four conductors to a second transferring and writing circuit 34 including a second writing terminal 36. A one bit counter 38 including a resetting terminal 40 is connected to both the first and second transferring and writing circuits 30 and 34 respectively.

The first transferring and writing circuit 30 is connected to a down counter 42 including a subtraction terminal 44 and connected through an "AND" circuit 46 to an output terminal 48 for providing a signal for instructing the re-transmission. The second transferring and writing circuit 34 is connected to a register 50 subsequently connected to a channel switching circuit 52.

The first transferring and writing circuit 30 is responsive to a binary value of an input supplied from the one bit counter 38 to transfer an input applied thereto from one to the other of the outputs from the memories 24 and 28 to conduct the transferred input to the output thereof. This is true in the case of the second transferring and writing circuit 34. More specifically, if the counter 38 supplies a binary ZERO to both circuits 30 and 34, the outputs from the memories 22 and 24 are developed at the outputs of the circuits 30 and 34 through the inputs thereto respectively. On the other hand, if the counter 38 supplies a binary ONE to the circuits 30 and 34, the output from the memories 28 and 26 are developed at the outputs of the first and second circuits 30 and 34 through their inputs respectively.

The first transferring and writing circuit 30 is also responsive to a writing pulse applied thereto through the writing terminal 32 to write the binary output resulting from either one of the memories 24 and 28 into the down counter 42.

The second transferring and writing circuit 34 is similarly responsive to a writing pulse applied thereto through the writing terminal 36 to write the binary output resulting from either one of the memories 22 and 26 into the register 50. The channel switching circuit 52 is controlled by the register 50 to switch from one to another of the transmission channels (not shown) in accordance with the particular binary coded signal registered on the register 50. For example, if the register 50 has registered thereon the most significant digit "*a*" of the address, the present channel is switched to a channel $fa + 1$.

On the other hand, each time the down counter 42 having written thereinto a binary coded member "*b*" for example receives a subtraction pulse from the terminal 44, the same successively counts down to $(b-1)$, $(b-2)$, . . . until the counter has a count of "1111" upon the entry of $(b+1)$ pulses. This triggers the output from the AND circuit 46 from binary ZERO to binary ONE while at the same time the counter 38 is caused to advance by one count. The output ONE from the AND circuit 46 is delivered, as an instruction for re-transmission through the output terminal 48.

In the initial condition of the arrangement as shown in FIG. 3, the counter 38 has been reset to a binary value of "00" so that the binary coded "*a*" from the memory 22 is connected to the output of the second transferring and writing circuit 34 while the binary coded "*b*" from the memory 24 is connected to the output of the first transferring and writing circuit 30. The terminal station No. 1134 has, as each of the "*a*" and "*b*", a value of ONE or a binary value of "0001". Prior to a first transmission, a writing pulse is applied to the writing terminal 36 and therefore the first transmission is effected through the channel $f_2$. Upon the first transmission terminating, a writing pulse is applied to the writing terminal 32 to write a binary number "0001" into the down counter 42.

If the terminal station receives no confirmation signal to the first call, then one subtraction pulse is applied to the terminal 44 each time it receives the synchronizing signal S from the central station. By receiving a second synchronizing pulse S, the down counter 42 has a binary value of 1111 to advance the counter 38 to ONE while delivering an instruction for re-transmission through the output terminal 48.

In response to the instruction for re-transmission, a writing pulse is applied to the writing terminal 36. Since the counter 38 has now a count of ONE, the content $c$ of the memory 26 is written into the register 50. That is, a binary value of "1 1" (decimal value of 3) is registered in the register 50. This causes the switching circuit 52 to switch the present channel to a channel $f_4$ after which the data is again transmitted to the central station.

Upon the completion of the re-transmission, a writing pulse is again applied to the terminal 32. Then the content $d$ of the memory 28 is written in the down counter 42. Namely the counter has a count of "0100" (decimal value of 4).

In this way, the binary coded $c$, $a$. $c$. $a$ are written into the register 50 one after another while the binary coded $b$, $d$, $b$, $d$ . . . are successively written into the down counter 42. Consequently, the following re-transmission is successively effected through channels $f_c+1, f_a+1, f_c+1$ . . . with time displays equal to time intervals for which $b+1, d+1, b+1$ . . . of the synchronizing signals S are received respectively until a confirmation signal is received for the transmitted data.

In other words, the selection of successive channels for re-transmission is accomplished by successively utilizing alternating ones of the digits in the digit positions of the address starting with the most significant digit thereof while a corresponding time delays for re-transmission are successively determined by utilizing the digit in the remaining digit positions thereof one after another until a confirmation is received.

After the confirmation signal has been received, a resetting pulse is applied to the terminal 40 to reset the counter 38 to a count of "00" to return it back to its initial state while stopping the operation of applying one pulse to the terminal 44 each time the synchronizing signal S is received.

Figures 4, 5:
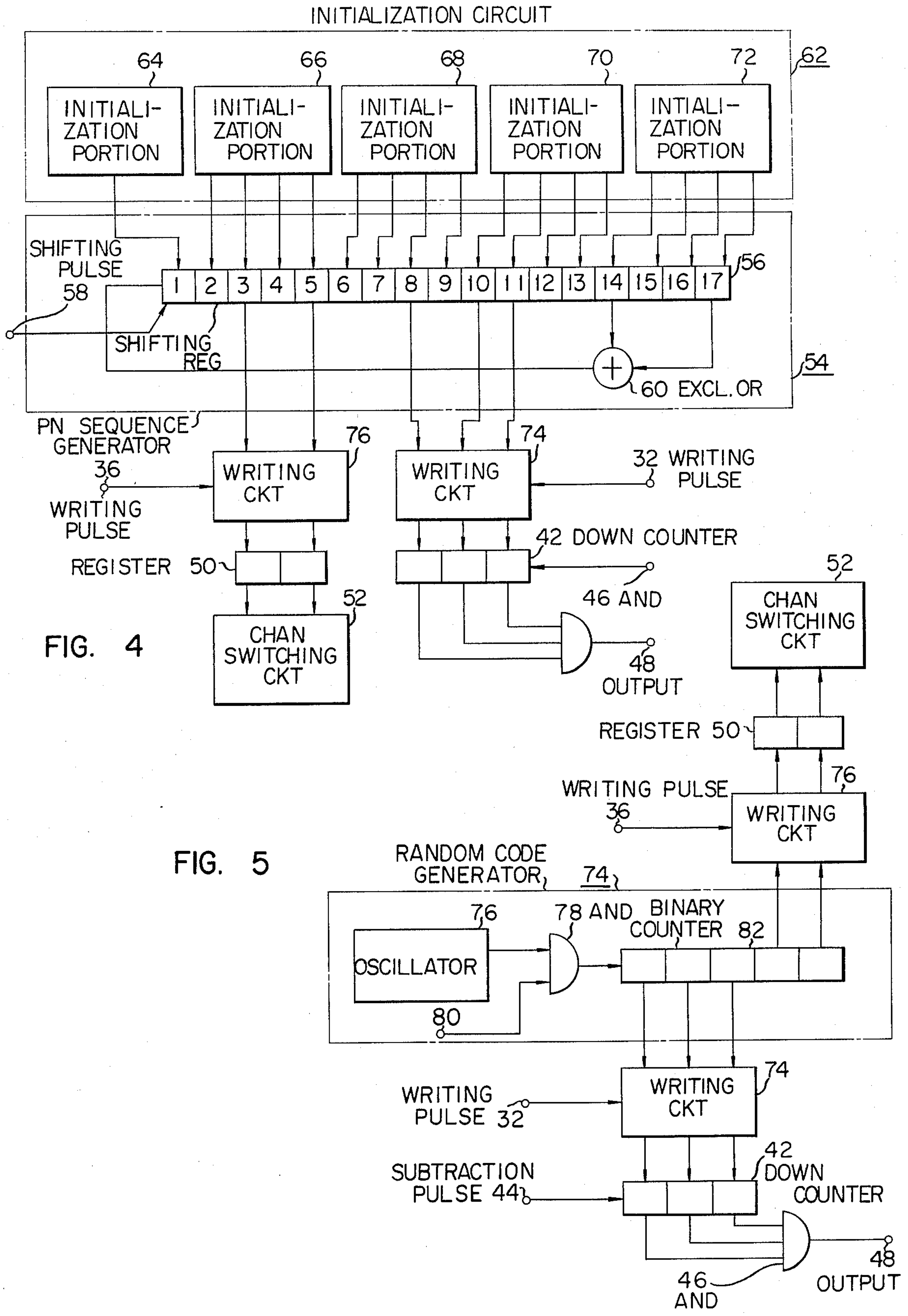
FIG. 4 is a block diagram similar to FIG. 3 but illustrating a modification of the arrangement shown in FIG. 3.
FIG. 5 is a block diagram similar to FIG. 3 but illustrating another modification of the arrangement shown in FIG. 3.

Referring now to FIG. 4, there is illustrated, a modification of the present invention following the process ($b$) as above described. The modification is to control the time delay in the case when a PN sequence generator is used to impart a random jump of channels and a random time delay to each of the terminal stations, assuming that the terminal stations have respective addresses in the form of binary coded four figure decimal numbers.

In FIG. 4 wherein like reference numerals designate the components identical to those illustrated in FIG. 3, a PN sequence generator generally designated by the reference numeral 54 is shown as including a 17 stage shifting register 56 having a shifting terminal 58 and an exclusive OR circuit 60 having a pair of inputs connected to a 14th stage and a 17th or the last stage of the shifting register 56 respectively and an output connected to a first stage thereof. The PN sequence generator 54 is operative to generate a train of pseudonoise pulses and connected to an initialization circuit generally designated by the reference numeral 62. The initialization circuit 62 is operative to set an initial value on the shifting register 54 and includes a plurality, in this case, five of initialization portions 64, 66, 68, 70 and 72 connected to the shifting register 54. More specifically, the initialization portion 64 is connected to the first stage of the shifting register 54 through a lead, and the initialization portion 66 is connected to the second, third, fourth and fifth stages thereof through sets of four leads. The initialization portions 68, 70 and 72 are similarly connected to different sets of four consecutive stages of the shifting resister 54 respectively.

The shifting register 54 has the 8th, 10th and 11th stages connected to a first writing circuit 74 including a writing terminal 32 and the 3rd and 5th stages connected to a second writing circuit 76 including a writing terminal 36. As in the arrangement of FIG. 3, the first writing circuit 74 is connected by three leads to a down counter 42 subsequently connected by three leads to an AND circuit 46 having an output connected to an output terminal 48. The second writing circuit 76 is connected through two leads to a register 50 subsequently connected to a channel switching circuit 52 through two leads.

In the PN sequence generator 54, the exclusive OR circuit 60 is operative to logically add the outputs from the 17th and 14th stages of the shifting register 56 with a modulo of "2" and to feed the resulting output back to the first stage thereof thereby to generate a train of pseudo-noise pulses having the number of pulse repetition times of $(2^{17}-1)$. The shifting register 56 is responsive to shifting pulses successively applied thereto through the sifting terminal 58 to successively shift the content thereof changing contents of flip-flops forming the respective register stages in a pseudorandom manner.

The initialization circuit 64 is operative to set a predetermined initial value on the shifting register 56 and therefore a predetermined initial condition of the PN sequence generator 54 depending upon the associated terminal station. Thus the initial value or condition is different from one to another of the terminal stations. For example, with one terminal station having an address number of "*abcd*", the initialization portion 66 sets the 2nd, 3rd, 4th and 5th register stages to a binary coded decimal "$a$" and the initialization portion 68 sets the 6th, 7th, 8th and 9th register stages to a binary coded decimal "$b$". Similarly, the initialization portion 70 sets the 10th, 11th, 12th and 13th register stages to a binary coded decimal "$c$", and the initialization portion 72 sets the 14th, 15th, 16th and 17th register stages to a binary coded decimal "$d$". The initialization portion 64 sets the first register stage to a binary ONE.

Prior to effecting a first data transmission from the associated terminal station, a writing pulse from the writing terminal 36 is applied to the second writing circuit 76 to write contents of specific register stages, in this case, for example, values of two bits in the 2nd and 5th stages of the register 56 into the register 50 through the writing circuit 76 thereby to control the channel switching circuit 52 to switch a transmission channel as determined by the two bit numbers written into the circuit 76. With two bit numbers used, four transmission channels can be selectively employed as determined by any of four binary numbers "00", "01", "10" and "11".

Then the switched transmission channel is used to effect a first data transmission while a predetermined number of shifting pulses are applied to the shifting register 56 through the terminal 58. Upon the completion of the first transmission, a writing pulse from the terminal 32 is applied to the first writing circuit 74 to write the contents of specific register stages, in this case, for example, values of three bits in the 8th, 10th and 11th register stages in the down counter 42 through the writing circuit 74. If no confirmation signal R is received then a subtraction pulse is applied to the counter 42 through the terminal 44 each time the synchronizing signal S is received as in the arrangement of FIG. 3. This causes the counter 42 to count down until it has a count of "111". At that time the "AND" circuit 46 delivers through the output terminal 48 and output "ONE" indicating an instruction for re-transmission. Thus the Re-transmission is delayed. With the subtracter 42 having written thereinto a value of $x$ that may range from zero to seven for three bits, the re-transmission is effected with a time delay equal to a time interval for which $(x + 1)$ synchronizing signals have been received. Prior to the re-transmission, a writing pulse is applied to the second writing circuit 76 through the terminal 36 to effect the switching of a channel as above described. Therefore the re-transmission is effected through the switched channel with the time delay determined as above described.

During the re-transmision, the predetermined number of the shifting pulses are applied through terminal 38 to the shifting register 56 to repeat the process as above described until a confirmation signal R is received.

In response to the reception of the confirmation signal R, the initialization circuit 62 is again operated to return the shifting register 56 back to its initial state.

Therefore it will be appreciated that by using the arrangement as shown in FIG. 4, the transmission channel and time delay utilized for the re-transmission is apparently changed in irregular manner for each transmission and that these changes are different from one to another of the terminal stations. Therefore the arrangement of FIG. 4 ensures that at least two terminal stations are prvented from continuously effecting the simultaneous transmission through a common transmission channel.

In FIG. 5 wherein like reference numerals designate the components identical to those shown in FIG. 4, there is illustrated another modification of the present invention suitable for controlling the transmission channel and time delay following the process ($c$) of imparting the quite random jump of the channel and a quite random time delay to each of terminal stations as above described.

In FIG. 5, a random code generator generally designated by the reference numeral 74 includes an oscillator 76 having poor frequency stability such as a multivibrator, an AND gate 78 having one input connected to the output of the oscillator 76 and the other input connected to a gating terminal 80 and a binary counter 82. The counter 82 is shown as being of 5 bit type and has a first stage connected to the output of the AND gate 78 and also to the first writing circuit 74, a second and a third stage connected to the first writing circuit 74, and the remaining stages connected to the second writing circuit 76. In other respects, the arrangement is similar to that shown in FIG. 4.

When the associated terminal station is transmitting data to the central station, a binary ONE continues to be applied to the other input to the AND gate 78 through the gating terminal 80 to prepare the gate 78 for passing the output from the oscillator 76 therethrough. Therefore the outupt from the oscillator 76 can be supplied through the AND gate 78 to the counter 82 to be counted. By selecting the oscillation frequency of the oscillator 76 to be sufficiently high, the counter 82 can be constructed such that it overflows, for example thousands of times or more during the transmission of data. This counter 82 cooperates with the oscillator 76 having poor frequency stability to provide a completely random count upon blocking the AND gate 78 by applying a binary ZERO to the gate through the gating terminal 80 after the completion of the transmission. In other words, the generator 74 generates an output coded at random.

In the presence of a call requested by the associated terminal station, a writing pulse is applied through the writing terminal 36 to the second writing circuit 76 simultaneously with the reception of a synchronizing signal. This causes the writing circuit 76 to write values of specific ones of random bits on the generator 82, in this case, for example, those of the 4th and 5th bits into the register 50. In this way, the register 50 has registered thereon a binary value $x$ that may be any of 0, 1, 2 and 3 for two bits. As in the arrangement of FIG. 4, the channel switching circuit 52 responds to the binary value $x$ to select a channel labelled for example $fx + 1$. Then data is transmitted through the selected channel. During this transmission, a binary ONE continues to be applied through the gating terminal 80 to the AND gate 78 to permit the output from the oscillator 76 to pass through the gate 78 to the counter 82 where the output is counted to change the count on the counter at random.

Immediately after the transmission was terminated to block the AND gate 78, a writing pulse is supplied through the terminal 32 to the first writing circuit 74 to write contents of specific bits on the counter 82, in this case, for example, those of the first three bits into the down counter 42. Thereafter the process as above described in conjunction with FIG. 4 is repeated to select a transmission channel and a time delay required for re-transmission in the absence of a confirmation signal received.

In the arrangment of FIG. 5, it will be appreciated that a transmission channel and a time delay associated with each of the terminal stations is changed quite randomly and independently of the other terminal stations.

While the present invention has been illustrated and described in conjunction with a few preferred embodiments thereof it is to be understood that various changes and modifications may be resorted to without departing from the spirit and scope of the invention. For example, while the present invention has been described in terms of the synchronizing signal delivered from the central station it is to be understood that the present invention is equally applicable to systems including the central station not delivering the periodic synchronizing signals. In the latter event, each of the terminal stations may be provided with means for producing pulses applied to the subtraction terminal 44 the repetition period of which is somewhat longer than a maximum length of data involved.

What we claim is:

1. A data transmission system for transmitting data between a central station and a plurality of terminal stations, said central station having means for simultaneously receiving signals through a plurality of channels assigned in common to said plurality of terminal stations, wherein the system comprises: control means for controlling the transmission from and the reception by each of said terminal stations including time delay means and channel switching means, said time delay means providing a controlled variable time delay signal for each of said terminal stations, said channel switching means switching different ones of said channels for use by each of said terminal stations; means in each of said terminal stations for transmitting data to said central station through a predetermined one of said channels; said central station being operative to receive the data from each of said terminal stations and to deliver a confirmation signal to each of said terminal stations following the reception of the data, means in each of said terminal stations for responding to the reception of said confirmation signal from said central station to terminate the transmission of data to said central station and for responding to the absence of said confirmation signal from said central station to actuate said time delay means to provide a predetermined time delay signal and also to actuate said channel switching means to switch from said predetermined channel to another predetermined channel; and means in each of said terminal stations responsive to the corresponding time delay signal for re-transmitting said data to said central station through said another predetermined channel after the lapse of said predetermined time delay.

2. A data transmisison system as claimed in claim 1, wherein said terminal stations have respective address numbers, and wherein in each of said terminal stations, said time delay and said another predetermined channel are selected in accordance with values of digits in the respective digit positions of the associated address number.

3. A data transmission system as claimed in claim 1, wherein each of said terminal station has an address number and wherein said control means includes means for selecting said channel and said time delay by alternately using digits in the respective digit positions of the associated address number starting with the most significant digit thereof until said confirmation is received by said terminal station.

4. A data transmission system as claimed in claim 1, wherein each of said terminal stations has an address number and wherein said control means includes a generator for generating a train of pseudo-noise pulses having an initial state set with said address number, and means for supplying shifting pulses to said generator to operate both said time delay means and said channel switching means in accordance with the output from said generator until said terminal station receives said confirmation signal from said central station.

5. A data transmission as claimed in claim 1, wherein said control means includes a random code generator, and means for operating both said time delay means and said channel switching means in accordance with the output from said random code generator until the associated terminal receives said confirmation signal from said central station.

* * * * *